May 6, 1930.  P. W. QUINN  1,757,587
LICENSE PLATE HOLDER
Filed Aug. 28, 1928   2 Sheets-Sheet 1
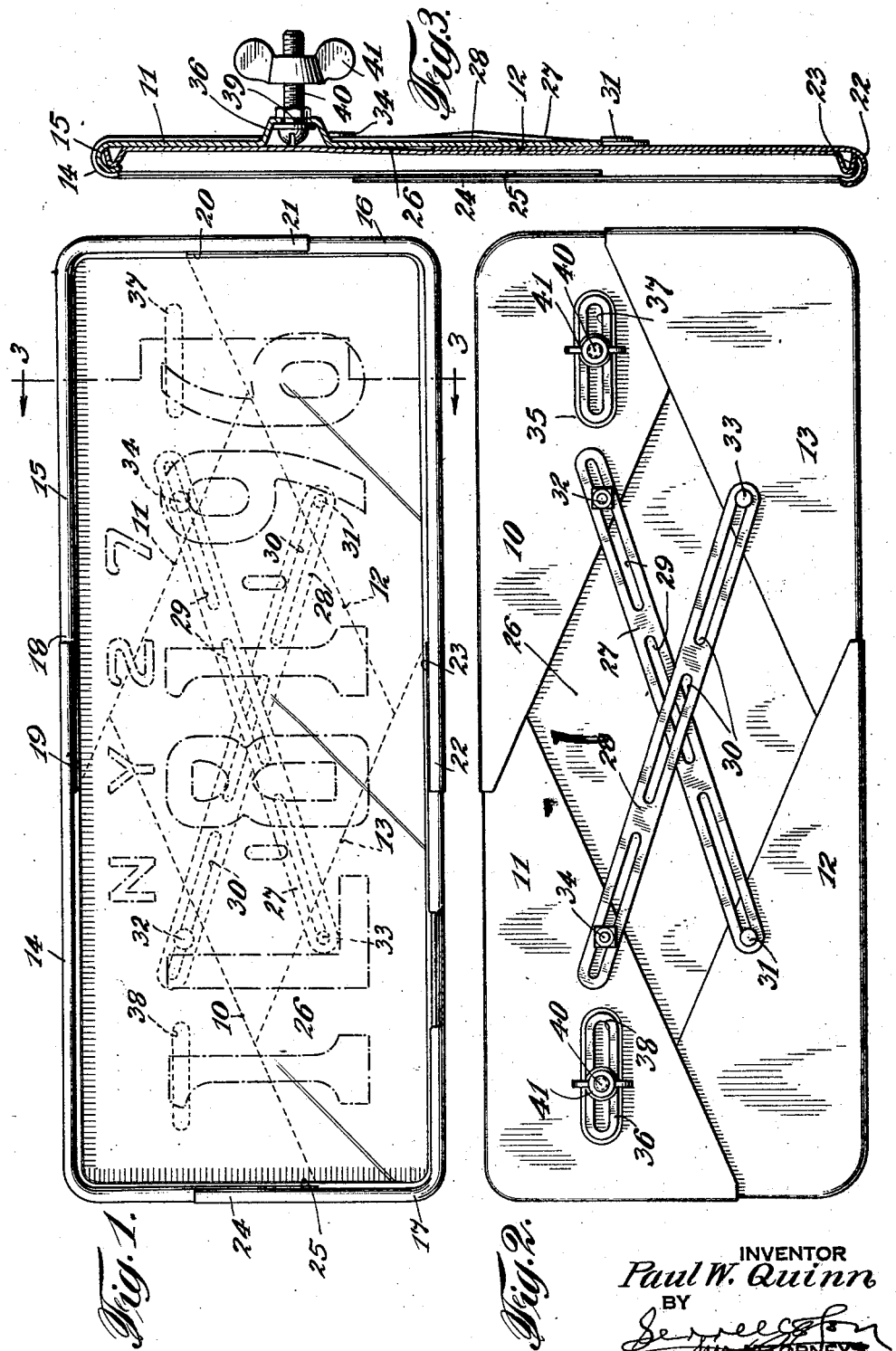
INVENTOR
Paul W. Quinn
BY
ATTORNEYS May 6, 1930.  P. W. QUINN  1,757,587
LICENSE PLATE HOLDER
Filed Aug. 28, 1928   2 Sheets-Sheet 2
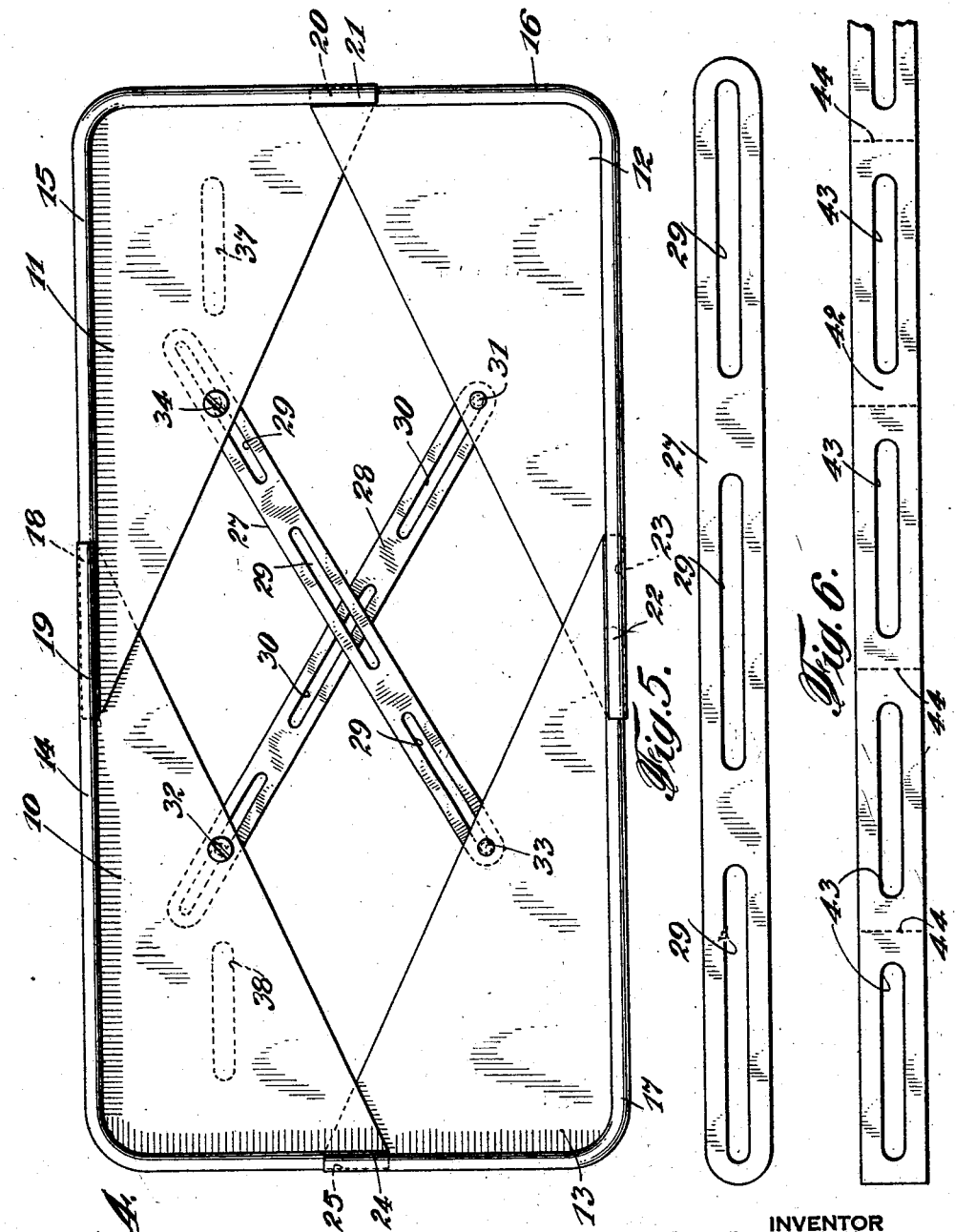
INVENTOR
Paul W. Quinn
BY
his ATTORNEYS Patented May 6, 1930

1,757,587

UNITED STATES PATENT OFFICE

PAUL W. QUINN, OF BROOKLYN, NEW YORK

LICENSE-PLATE HOLDER

Application filed August 28, 1928. Serial No. 302,454.

This invention relates to a license plate holder. I am aware that heretofore license plate holders of various types have been made and used. So far, however, as these have come to my knowledge it has been necessary to construct different size license plate holders for license plates of different dimensions. As is more or less generally known license plates for motor vehicles as issued by the several States are not uniform in size. In fact I believe that in some instances the license plates as issued by the same State vary in size. Consequently in dealing in and supplying license plate holders it is necessary to make the holders of such dimensions that they will receive and contain license plates of predetermined proportions.

The object of my invention is to overcome the necessity of providing license plate holders of various sizes to accommodate different size license plates by constructing a license plate holder so as to make it adjustable in such a manner that the parts thereof may be fitted to a license plate of any standard size so as to contain and support the same in position on a motor or other vehicle. In carrying out the invention the license plate holder made in accordance therewith is preferably constructed to comprise a plurality of sections each having a peripheral rib which is rolled or otherwise with the end portions of the ribs adapted to telescope in order that these sections may be adjustable relatively to one another to fit any standard size license plate.

Further, the invention includes the use of suitable tie rods or straps for connecting the sections of the license plate holder in their adjusted positions, together with means for connecting the holder to a support provided therefor on the vehicle. Moreover, the rolled rim of the sections or parts of the license plate holder is preferably so made that the peripheral portion of the license plate is receivable therein and thus retained in position when the parts are adjusted and connected to each other, as will be hereinafter more particularly described.

In the drawing Fig. 1 is an elevation showing a license plate holder made in accordance with this invention, Fig. 2 is a rear elevation of the same, Fig. 3 is an enlarged section on line 3—3, Fig. 1, Fig. 4 is a view similar to Fig. 1 showing the parts of the holder in extended positions and without the license plate contained therein, Fig. 5 is a plan of one of the tie straps, and Fig. 6 is a plan of a modified form of tie strap.

By reference to the drawing it will be seen that in carrying out this invention the license plate holder made in accordance therewith is constructed in sections, preferably four in number as illustrated at 10, 11, 12 and 13 respectively. As illustrated these sections are triangular although, of course, the invention is not so limited. In any event, the adjacent edges of each of the sections are rolled or rounded, for example, the rolled edges of the section 10 are indicated at 14, those of the section 11 are indicated at 15, those of the section 12 are indicated at 16 and those of the section 13 are indicated at 17.

The end portion of the rolled edge of one section is adapted to enter or telescope with the adjacent end portion of another section. As illustrated, the end portion of the long rolled edge of the section 10 as indicated at 18 is adapted to receive the end rolled portion 19 of the long rolled edge of the section 11, these parts being shiftable to position, the one within the other. The end portion of the other rolled edge of the section 12 is adapted to slide within the end portion of the rolled edge of the short side of the section 11, the latter being indicated at 20 and the former at 21, so that these parts are adjustable to positions relatively to each other. In like manner the end portion 22 of the long rolled edge of the section 12 is adapted to receive the end portion 23 of the long rolled edge of the section 13, and similarly the end portion 24 of the other rolled edge of the section 13 is adapted to receive the end portion 25 of the short rolled edge of the section 10. It will now be understood that the parts of the license plate holder may be adjusted longitudinally by means of the sliding or telescoping joints between the long rolled edges of the sections thereof to adjust the sections of the holder longitudinally and that a similar adjustment is effected transversely of the holder by the sliding or telescoping joints at the ends of the short rolled edges of the sections of the holder. Consequently the sections of the holder, for example, may be separated sufficiently far, as illustrated in Fig. 4, to admit a license plate 26 of given dimensions and the parts then adjusted so as to cause the edge portions of the license plate to lie within the grooves formed by the rolled edges of the sections of the holder, as illustrated in Fig. 1.

In order to secure the sections of the license plate holder in their relative positions with the license plate contained therein I may employ a plurality of tie bars or straps. As illustrated two of these tie bars or straps are employed, one being indicated at 27 and the other at 28. The tie strap 27 is made with a series of longitudinal slots 29 and similarly the tie strap 28 is made with a series of slots 30. One end of the tie strap 28 is shown as connected to the section 12 of the holder by a screw 31 and the opposite end of the tie strap 28 to the section 10 by a screw 32.

Similarly one end of the tie strap 27 is connected at one end to the section 13 of the holder by a screw 33 and its opposite end to the section 11 by a screw 34. The screws 31, 32, 33 and 34 as will be understood pass through slots in the tie straps and after the parts of the holder are adjusted to position may be turned down in openings provided therefor in their respective sections to secure the straps in place and thereby fasten the sections to one another with a license plate in position therein.

As illustrated predetermined members or sections of the license plate holder may be provided with means for securing the holder in place on a vehicle, for example, the sections 10 and 11 may be provided with ribs 35 and 36 in which respectively there are slots 37 and 38 adapted to receive bolts 39. As illustrated in Fig. 3 the ribs provide grooves sufficiently deep to receive the heads of the bolts and the shanks or stems 40 of the bolts are adapted to extend through apertures provided therefor in support brackets and are fitted with wing nuts 41 or other devices for securing the same in place and thus supporting the license plate holder and the license plate therein.

Instead of employing the forms of tie straps as illustrated in Figs. 2 and 4 and as hereinbefore described, I may employ the form of tie strap as illustrated in Fig. 6. This includes a strip of metal 42 provided with spaced longitudinally disposed slots 43 between each of which there is a transverse score line 44 by means of which the tie strap may be broken off at the necessary length to be employed in connecting and securing together the sections of a license plate holder to adjust the parts to receive and fit a license plate of predetermined dimensions. It will be obvious, of course, that various equivalent changes may be made in the construction and use of the plate holder without departing from the nature and spirit of the invention.

I claim as my invention:

1. A license plate holder comprising four triangular sections each having two of its edges provided with a rolled rim, the end portion of the rolled rim edge of one section being adapted to telescope with the end portion of the rolled rim edge of another section whereby the sections are adjustable both longitudinally and transversely to receive a license plate within the rolled rim edges thereof, the license plate being held in position by the rolled rim edges of the sections of the holder.

2. A license plate holder comprising four triangular sections each having two of its edges provided with a rolled rim, the end portion of the rolled rim edge of one section being adapted to telescope with the end portion of the rolled rim edge of another section whereby the sections are adjustable both longitudinally and transversely to receive, fit and contain a license plate, and means for connecting the oppositely disposed sections of the license plate holder to maintain all the sections thereof in position relatively to each other.

3. A license plate holder comprising four triangular sections each having two of its edges provided with a rolled rim, the end portion of the rolled rim edge of one section being adapted to telescope with the end portion of the rolled rim edge of another section whereby the sections are adjustable both longitudinally and transversely to receive, fit and contain a license plate, and sets of tie straps extending between and connected to transversely disposed sections of the holder for securing the same in position.

4. A license plate holder comprising four triangular sections each having two of its edges provided with a rolled rim, the end portion of the rolled rim edge of one section being adapted to telescope with the end portion of the rolled rim edge of another section whereby the sections are adjustable both longitudinally and transversely to receive, fit and contain a license plate, sets of tie straps extending between and connected to transversely disposed sections of the holder for securing the same in position, and means for connecting predetermined sections of the license plate holder to a support.

Signed by me this 30th day of July, 1928.

PAUL W. QUINN.